(12) United States Patent
Robinson et al.

(10) Patent No.: US 9,724,784 B2
(45) Date of Patent: Aug. 8, 2017

(54) OPTICAL FEEDTHROUGH FOR MEDICAL DEVICES

(75) Inventors: Reginald D. Robinson, Plymouth, MN (US); David D. Differding, Edina, MN (US); James A. Johnson, Blaine, MN (US); Bernard Q. Li, Plymouth, MN (US); Gerald G. Lindner, Lino Lakes, MN (US); Brad C. Tischendorf, Minneapolis, MN (US); Andrew J. Thom, Maple Grove, MN (US)

(73) Assignee: Medtronic, Inc., Minneapolis, MN (US)

( * ) Notice: Subject to any disclaimer, the term of this patent is extended or adjusted under 35 U.S.C. 154(b) by 1961 days.

(21) Appl. No.: 12/401,239

(22) Filed: Mar. 10, 2009

(65) Prior Publication Data

US 2010/0230392 A1    Sep. 16, 2010

(51) Int. Cl.
| | | |
|---|---|---|
| *B23K 26/00* | (2014.01) | |
| *B23K 26/20* | (2014.01) | |
| *B23K 26/21* | (2014.01) | |
| *A61N 1/375* | (2006.01) | |
| *B29C 65/14* | (2006.01) | |
| *B29C 65/16* | (2006.01) | |

(Continued)

(52) U.S. Cl.
CPC ............ *B23K 26/206* (2013.01); *B23K 26/21* (2015.10); *A61N 1/375* (2013.01); *B29C 65/14* (2013.01); *B29C 65/1406* (2013.01); *B29C 65/16* (2013.01); *B29C 65/4845* (2013.01); *B29C 66/54* (2013.01); *B29C 2035/0827* (2013.01); *G02B 6/3897* (2013.01); *G02B 6/4248* (2013.01)

(58) Field of Classification Search
CPC ................................ B23K 26/00; B23K 26/04

USPC .............. 219/121.85, 121.6, 121.63, 121.64, 219/121.65

See application file for complete search history.

(56) References Cited

U.S. PATENT DOCUMENTS

| | | |
|---|---|---|
| 4,340,097 A | 7/1982 | Ammann et al. |
| 5,902,326 A | 5/1999 | Lessar et al. |

(Continued)

FOREIGN PATENT DOCUMENTS

| | | |
|---|---|---|
| DE | 3330421 A1 | 3/1985 |
| EP | 1 234 595 A2 | 8/2002 |

(Continued)

OTHER PUBLICATIONS

U.S. Patent Application "Posture State Management for Posture-Responsive Therapy" having U.S. Appl. No. 61/080,089, filed Jul. 11, 2008.

(Continued)

*Primary Examiner* — Dana Ross
*Assistant Examiner* — Ayub Maye
(74) *Attorney, Agent, or Firm* — Shumaker & Sieffert, P.A.

(57) ABSTRACT

In general, the disclosure is directed toward transmitting radiant energy across a boundary of a medical device via an optical feedthrough. A system for transmitting radiant energy across a boundary of a medical device includes a first functional module of a medical device, a second functional module of the medical device, an optical feedthrough assembly coupled to the first functional module, and a radiant energy source that emits a beam through the optical feedthrough assembly to perform a manufacturing process on the first functional module and the second functional module.

28 Claims, 14 Drawing Sheets

(51) Int. Cl.
    *B29C 65/48*     (2006.01)
    *B29C 65/00*     (2006.01)
    *B29C 35/08*     (2006.01)
    *G02B 6/38*     (2006.01)
    *G02B 6/42*     (2006.01)

(56) References Cited

U.S. PATENT DOCUMENTS

| | | | |
|---|---|---|---|
| 6,047,643 A * | 4/2000 | Benner et al. | 102/201 |
| 6,068,617 A | 5/2000 | Richmond | |
| 6,293,922 B1 | 9/2001 | Haase | |
| 6,626,867 B1 | 9/2003 | Christenson et al. | |
| 6,635,049 B1 | 10/2003 | Robinson et al. | |
| 6,743,204 B2 | 6/2004 | Christenson et al. | |
| 2002/0035385 A1 | 3/2002 | Deziz | |
| 2005/0080465 A1 | 4/2005 | Zelickson et al. | |
| 2006/0259090 A1 * | 11/2006 | He et al. | 607/36 |
| 2007/0134974 A1 * | 6/2007 | Starke et al. | 439/493 |

FOREIGN PATENT DOCUMENTS

| | | | | |
|---|---|---|---|---|
| EP | 1234595 A2 * | 8/2002 | | A61M 25/00 |
| EP | 1621177 A1 | 2/2006 | | |
| WO | WO 2006/034814 A1 | 6/2006 | | |
| WO | 2008121298 A1 | 10/2008 | | |

OTHER PUBLICATIONS

Notification of Transmittal of the International Search Report and the Written Opinion of the International Searching Authority for patent application No. PCT/US2010/022685, mailed Apr. 21, 2010, 12 pages.

\* cited by examiner

OPTICAL FEEDTHROUGH FOR MEDICAL DEVICES

TECHNICAL FIELD

The invention relates to medical devices.

BACKGROUND

A variety of medical devices are used for chronic, e.g., long-term, delivery of therapy to patients suffering from a wide range of conditions, such as chronic pain, tremor, Parkinson's disease, epilepsy, urinary or fecal incontinence, sexual dysfunction, obesity, or gastroparesis. As examples, electrical stimulation generators are used for chronic delivery of electrical stimulation therapies such as cardiac pacing, neurostimulation, muscle stimulation, or the like. Pumps or other therapeutic agent delivery devices may be used for chronic delivery of therapeutic agents, such as drugs. Typically, such devices provide therapy continuously or periodically according to parameters contained within a program. A program may include values for each of a plurality of parameters, specified by a clinician.

Manufacturing of medical devices and, in particular, medical devices configured for chronic implantation, may be complex. An outer housing of such implantable medical devices (IMDs) may be hermetically sealed to prevent fluid ingress. Additionally, IMDs may be sterilized prior to implantation within a patient. Since failure of an IMD may require surgical explantation of the IMD, IMDs may also be tested to help ensure that they will function as intended throughout their useful life.

SUMMARY

In general, the disclosure is directed to methods and apparatus for transmitting radiant energy across a boundary of a medical device via an optical feedthrough. Transmitting radiant energy across a boundary may be useful in performing manufacturing processes on or within a medical device. As one example, an optical feedthrough may be utilized to combine or separate functional modules of a medical device.

In one embodiment, the invention is directed to a system including a first functional module of a medical device, a second functional module of the medical device, an optical feedthrough assembly coupled to the first functional module, and a radiant energy source that emits a beam through the optical feedthrough assembly to perform a manufacturing process on the first functional module and the second functional module.

In another embodiment, the invention is directed to a method including assembling a first functional module of a medical device, assembling a second functional module of the medical device, coupling an optical feedthrough assembly to the first functional module, and applying radiant energy through the optical feedthrough assembly to perform a manufacturing process on the first functional module and the second functional module.

In another embodiment, the invention is directed to a system including means for assembling a first functional module of a medical device, means for assembling a second functional module of the medical device, means for coupling an optical feedthrough assembly to the first functional module, and means for applying radiant energy through the optical feedthrough assembly to perform a manufacturing process on the first functional module and the second functional module.

The details of one or more embodiments of the invention are set forth in the accompanying drawings and the description below. Other features, objects, and advantages of the invention will be apparent from the description and drawings, and from the claims.

DETAILED DESCRIPTION

In general, the disclosure is directed to apparatus and processes for transmitting radiant energy across a boundary of a medical device via an optical feedthrough. Transmitting radiant energy across a boundary may be useful in performing manufacturing processes, e.g., welding, cutting, sterilization, depyrogenation, and curing, on or within a medical device. As one example, an optical feedthrough may be utilized to combine or separate functional modules of a medical device.

Currently, many medical devices are monolithic and, therefore, built in sequence. These monolithic devices may possess intrinsic architectural constraints that preclude significant reduction in manufacturing lead times. An effective means of removing these constraints may be to partition a medical device into functional modules. Such functional modules may be independently assembled and tested. Since various functional modules may be assembled concurrently, partitioning a medical device into functional modules may reduce manufacturing lead time. If a medical device is partitioned into independently assembled functional modules, a system and technique for combining the modules is necessary. Optical feedthroughs may provide an economical means for combining independently assembled functional modules of a medical device. Optical feedthroughs may also be utilized to perform other manufacturing processes on or within a medical device, such as separating functional modules of a medical device.

Figure 1:
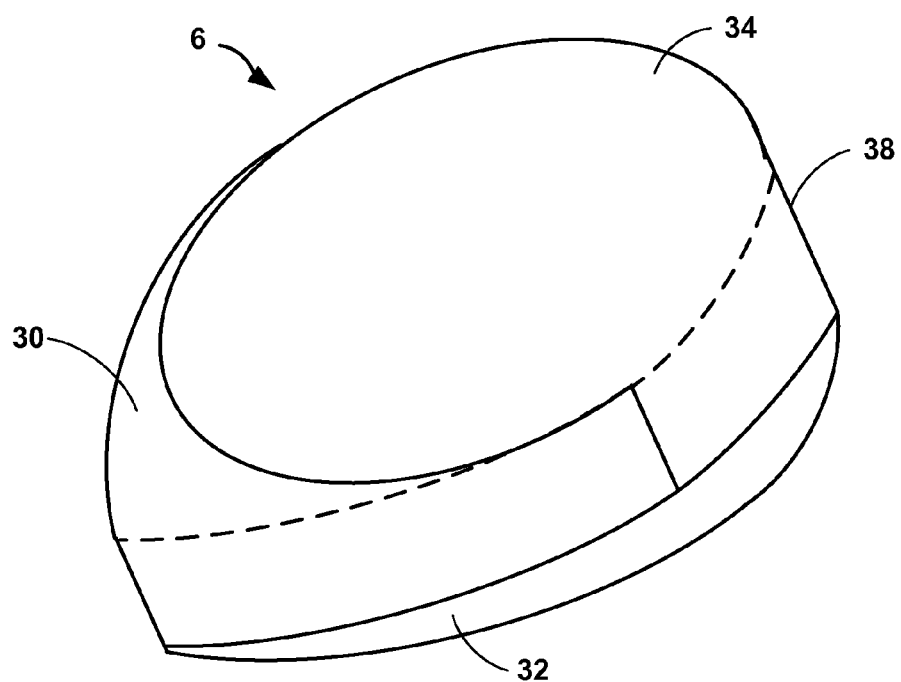
FIG. 1 is a conceptual diagram illustrating a perspective view of an implantable medical device (IMD) including a plurality of independently assembled functional modules.

FIG. 1 is a conceptual diagram illustrating a perspective view of an implantable medical device (IMD) 6 including a plurality of independently assembled functional modules 30, 32, and 34. Although three modules 30, 32, and 34 are illustrated in the example of FIG. 1, IMD 6 may include any number of independently assembled functional modules. Additionally, although each of modules 30, 32, and 34 provide a portion of outer housing 38 of IMD 6 in the example illustrated in FIG. 1, IMD 6 may also include one or more modules enclosed within outer housing 38. As described in further detail below, modules 30, 32, and 34 may be coupled together or separated from one another by transmitting optical energy into IMD 6 through an optical feedthrough.

The techniques described in this disclosure may be generally applicable to a variety of medical devices including external and implantable medical devices. For example, techniques described in this disclosure may be applicable to a therapeutic agent delivery device configured to deliver a drug or other therapeutic agent to a patient, e.g., via one or more catheters. As another example, techniques described in this disclosure may be applicable to an electrical stimulator configured to deliver electrical stimulation therapy to a patient via one or more stimulation electrodes. Examples medical devices, such as therapy therapeutic agent delivery devices and electrical stimulators, are described in further detail in U.S. Provisional Patent Application No. 61/080,089 to Skelton et al., which was filed on Jul. 11, 2008 is entitled "POSTURE STATE MANAGEMENT FOR POSTURE-RESPONSIVE THERAPY," and is incorporated herein by reference in its entirety. The techniques described in this disclosure may also be applicable to non-medical devices, such as nanodevices and/or devices with one or more sterile components. Application of the techniques of this disclosure to implantable medical devices (IMDs), e.g., IMD 6, will be described for purposes of illustration, but without limitation as to other types of medical or non-medical devices.

Since failure of IMD 6 may require surgical explantation, the components of IMD 6, including modules 30, 32, and 34, may be tested to help ensure that IMD 6 will function as intended throughout its useful life. In some examples, each of modules 30, 32, and 34 may be independently tested. Testing each of modules 30, 32, and 34 independently may decrease manufacturing lead time, because modules 30, 32, and 34 may be tested concurrently. Additionally, if one of modules 30, 32, and 34 is faulty, the other modules may still be used in IMD 6, which may result in fewer wasted resources.

Each of functional modules 30, 32, and 34 may include components of IMD 6. For example, each of modules 30, 32, and 34 may include a shell that encloses one or more components of IMD 6. In some examples, each of modules 30, 32, and 34 may include components that perform a specific function of IMD 6. As described with respect to FIG. 2, one example module 30 of IMD 6 may be a catheter access port module that allows direct access to a catheter coupled to IMD 6.

Figure 2:
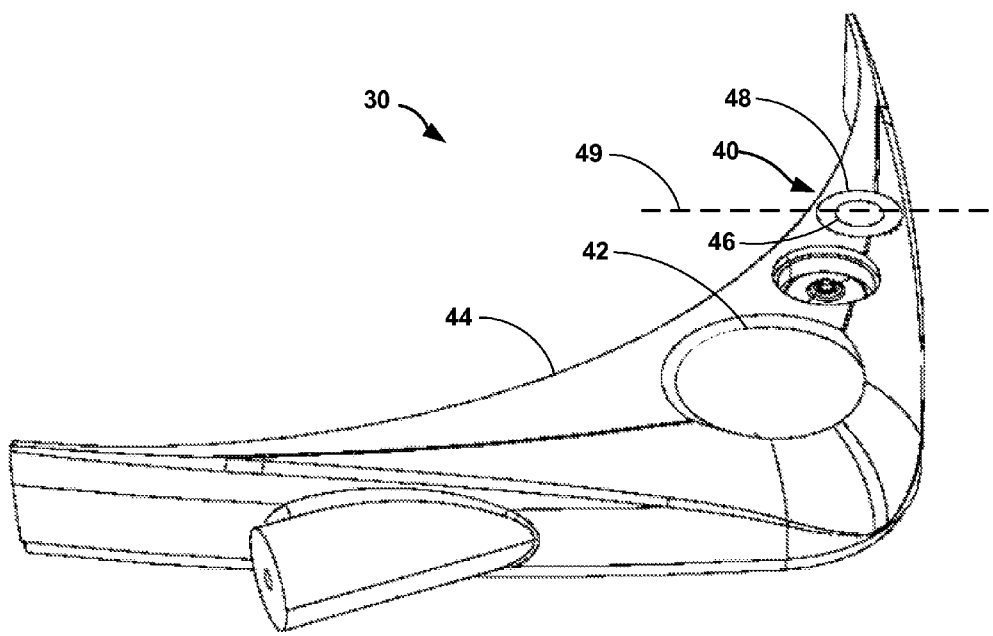
FIG. 2 is a conceptual diagram illustrating a perspective view of one of the independently assembled functional modules of FIG. 1 in further detail.

FIG. 2 is a conceptual diagram illustrating a perspective view of module 30 of FIG. 1. Module 30 includes an optical feedthrough assembly 40 that permits module 30 to be joined to another module of a medical device, e.g., module 32 (FIG. 1) of IMD 6 (FIG. 1). In general, module 30 may be any functional module of a partitioned medical device. In the example illustrated in FIG. 2, module 30 is a catheter access port module, e.g., of IMD 6 or any therapeutic agent delivery device. Module 30 may be assembled and tested independently of the other components of IMD 6.

Module 30 may include catheter access port 42. Catheter access port 42 may be accessible percutaneously by a hypodermic needle when IMD 6 is implanted within a patient. A septum of catheter access port 42 may provide direct access to a catheter coupled to IMD 6, e.g., by bypassing a pump mechanism of IMD 6, and allow a bolus of drug or other therapeutic agent to be administered directly into the body of the patient at the infusion site of the catheter. Catheter access port 42 may also be used as a diagnostic tool to troubleshoot catheter or infusion problems. An example of an implantable therapeutic agent delivery device having a catheter access port is described in U.S. Pat. No. 6,293,922 to Haase, which issued on Sep. 25, 2001 and is entitled "Apparatus And Method For Guiding And Limiting Access By Hypodermic Needles To Septum Of A Human Implantable Medical Treatment Device," and is incorporated herein by reference in its entirely.

Module 30 may be enclosed within shell 44. Shell 30 may provide a portion of outer housing 38 of IMD 6 or be separate from outer housing 38 of IMD 6. In some examples, shell 44 may provide a hermetic housing for module 30. In the example illustrated in FIG. 2, shell 44 may include a flexible membrane (not shown) that covers catheter access port 42 to prevent fluid ingress while still allowing access to catheter access port 42 via a hypodermic needle. Shell 44 may be constructed of biocompatible materials, such as titanium, stainless steel, silicone, or polyurethane. Hermetically-sealing module 30, e.g., via shell 44, may allow module 30 to be sterilized independently of the other modules of IMD 6. Additionally, as described in further detail with respect to FIG. 5, optical feedthrough assembly 40 may allow module 30 may be combined with another sterile, hermetically-sealed module of IMD 6 while maintaining the sterility of both modules.

Optical feedthrough assembly 40 of module 30 includes optical window 46 and ferrule fitting 48. Optical window 46 may be configured to allow radiant energy to pass through. For example, optical window 46 may appear to be transparent, translucent or opaque to visible light, but should be at least partially transmissive over a wavelength range of a source of radiant energy. The shape and material composition of optical window 46 may be selected based on the desired optical characteristics of optical window 46, and suitable materials include, for example glass, sapphire, polymer, and/or crystalline material. For example, optical window 46 may be constructed of single-crystal sapphire or thermal shock resistant borosilicate glass. Ferrule fitting 48 of optical feedthrough assembly 40 may be sized, shaped, and/or otherwise configured to allow optical feedthrough assembly 40 to be coupled to shell 44 of module 30. For example, optical feedthrough assembly 40 may be configured to fit within an aperture defined by shell 44 of module 30. In examples in which shell 44 provides a hermetic housing for module 30, the interface between optical feedthrough assembly 40 and shell 44 may be hermetically sealed.

Figure 3:
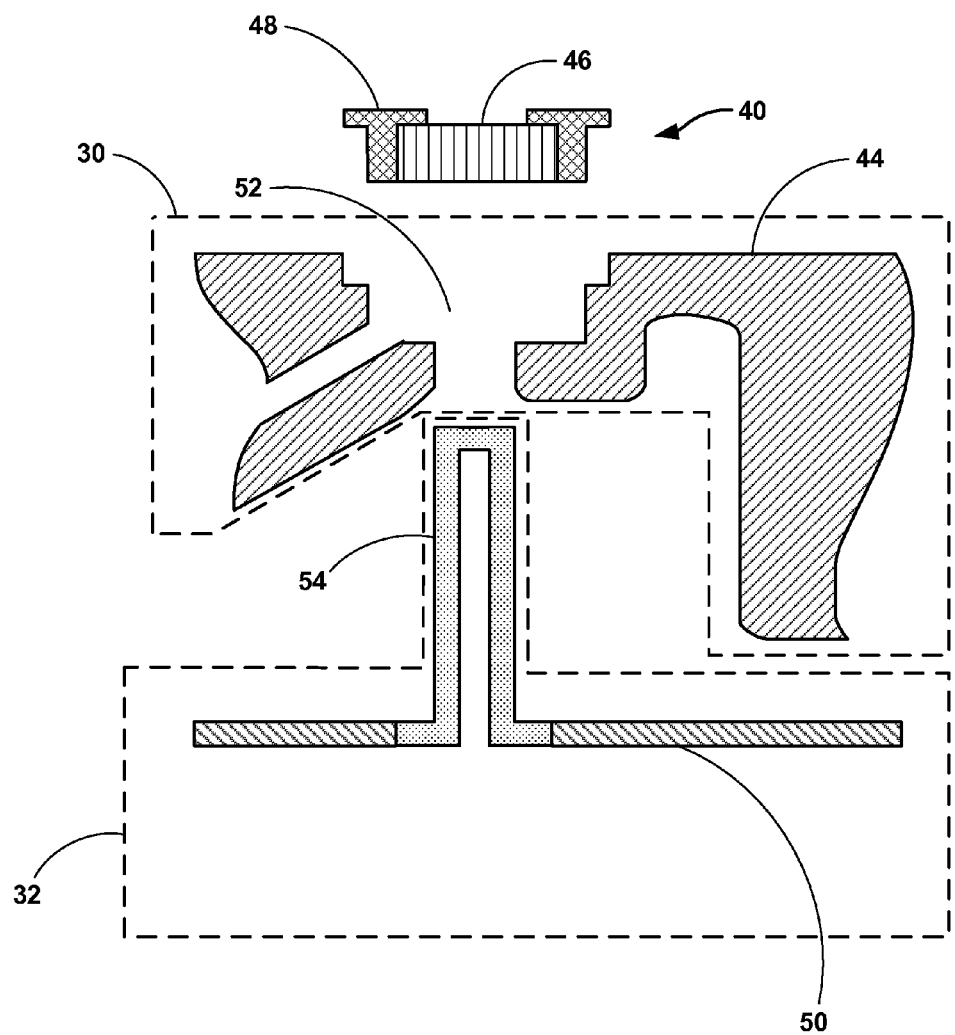
FIG. 3 is a conceptual diagram illustrating a cross-sectional view of two independently assembled functional modules and an optical feedthrough assembly.

FIG. 3 is a conceptual diagram illustrating a cross-sectional view of module 30 (FIG. 2), optical feedthrough assembly 40 (FIG. 2), and a second functional module 32 (FIG. 1) of IMD 6 (FIG. 1). Dashed lines are shown in FIG. 3 to illustrate two separate modules 30 and 32. For example, the dashed lines shown in FIG. 3 may represent example outlines of modules 30 and 32.

In the example of FIG. 3, module 32 is drawn generically. Module 32 may include a shell 50, a portion of which is illustrated within the dashed line representing module 32 in FIG. 3 for purposes of example. Shell 50 of module 32 may be substantially similar to shell 44 of module 30. In some examples, shell 50 is a hermetic housing of module 32. In such examples, module 32 may be sterile, e.g., shell 50 and/or the components enclosed within hermetically-sealed shell 50 may be sterile.

FIG. 3 illustrates a cross-sectional view of module 30 and optical feedthrough assembly 40 taken along line 49 of FIG. 2. As illustrated in FIG. 3, shell 44 of module 30 defines aperture 52 sized, shaped, and/or otherwise configured to accept optical feedthrough assembly 40. For example, aperture 52 may be sized and shaped to mate with optical feedthrough assembly 40. Optical feedthrough assembly 40 may be coupled to shell 44 to provide means for coupling modules 30 and 32 together.

Module 32 may include fitting 54 sized, shaped, and/or otherwise configured to couple to module 30. For example, aperture 52 of shell 44 of module 30 may be configured to accept fitting 54 of module 32 in addition to optical feedthrough assembly 40. In this manner, fitting 54 of module 32 may be sized and shaped to mate with aperture 52 of module 30. The coupling between modules 30 and 32 is described in further detail with respect to FIG. 5.

Figure 4:
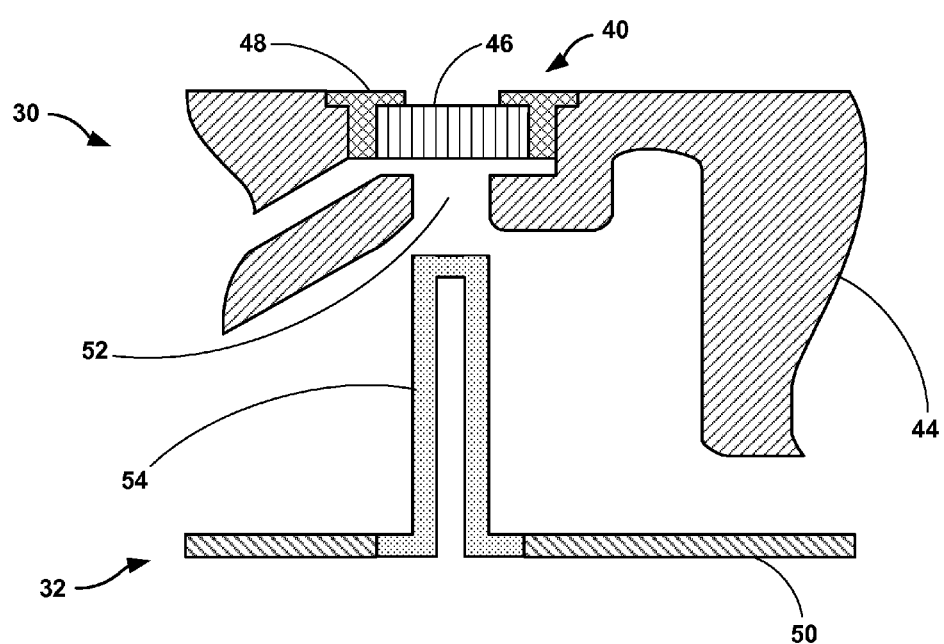
FIG. 4 is a conceptual diagram illustrating a cross-sectional view of an optical feedthrough assembly coupled to a shell of a functional module.

FIG. 4 is a conceptual diagram illustrating a cross-sectional view of optical feedthrough assembly 40 coupled to shell 44 of module 30. Optical feedthrough assembly 40 may be welded or otherwise coupled to shell 44. As one example, optical feedthrough assembly 40 may be welded to shell 44 around the perimeter of aperture 52. As another example, optical feedthrough assembly 40 may be coupled to shell 44 via an adhesive, such as an epoxy. In examples in which shell 44 provides a hermetic housing for module 30, the interface between optical feedthrough assembly 40 and shell 44 may be hermetically sealed.

Figure 5:
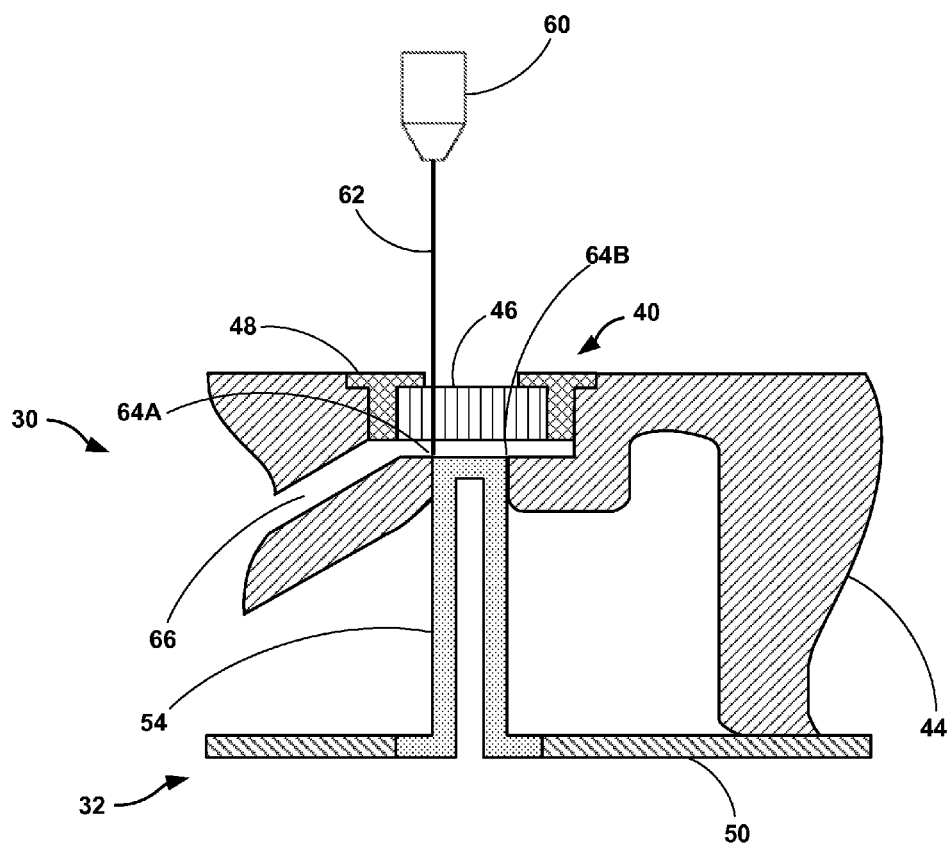
FIG. 5 is a conceptual diagram illustrating a cross-sectional view of two independently assembled functional modules coupled together via an optical feedthrough assembly.

FIG. 5 is a conceptual diagram illustrating a cross-sectional view of independently assembled functional modules 30 and 32 coupled together via optical feedthrough assembly 40. Radiant energy source 60, e.g., laser 60, may emit beam 62 through optical window 46 to couple modules 30 and 32 together, e.g., to hermetically-seal the interface between modules 30 and 32. Modules 30 and 32 may be coupled together around an outer perimeter of fitting 54. Locations 64A and 6B represent two example positions on the outer perimeter of fitting 54 where modules 30 and 32 may be coupled together. As one example, radiant energy source 60 may emit beam 62 through optical window 46 to weld fitting 54 of module 32 to shell 44 of module 30 around an outer perimeter of fitting 54. As another example, radiant energy source 60 may emit beam 62, e.g., an ultraviolet beam, through optical feedthrough assembly 40 to cure an adhesive, e.g., an ultraviolet curable adhesive, on an outer perimeter of fitting 54 to couple fitting 54 of module 32 to shell 44 of module 30. In either example, the interface between modules 30 and 32 may be hermetically sealed.

In examples in which shell 44 provides a hermetic housing for module 30, optical feedthrough assembly 40 may allow radiant energy to be transferred across hermetic boundary 44. Also, if module 30 is sterile, e.g., shell 44 and/or the components enclosed within shell 44 are sterile, optical feedthrough assembly 40 may allow module 30 to be coupled to module 32 while maintaining the sterility of module 30. Additionally, if module 32 is sterile, e.g., shell 50 and/or the components enclosed within shell 50 are sterile, module 32 may be coupled to module 30 using optical feedthrough assembly 40 while maintaining the sterility of module 32. Additionally, the coupling between modules 30 and 32 may provide a hermetically-sealed interface.

In examples in which welding occurs across optical window 46 to couple modules 30 and 32 together, module 30 may define pathway 66 for a cover gas. The cover gas may be inserted into pathway 66 prior to welding to improve weld quality. Pathway 66 may allow the region proximate to the weld location, e.g., proximate to locations 64A and 64B, to be pressurized with cover gas. Trapping the cover gas in a small enclosure proximate to the weld location may prevent the cover gas from escaping to other regions and decrease the amount of cover gas used. Reducing the amount of cover gas used may help minimize the potential environmental impact of the cover gas.

Figure 6:
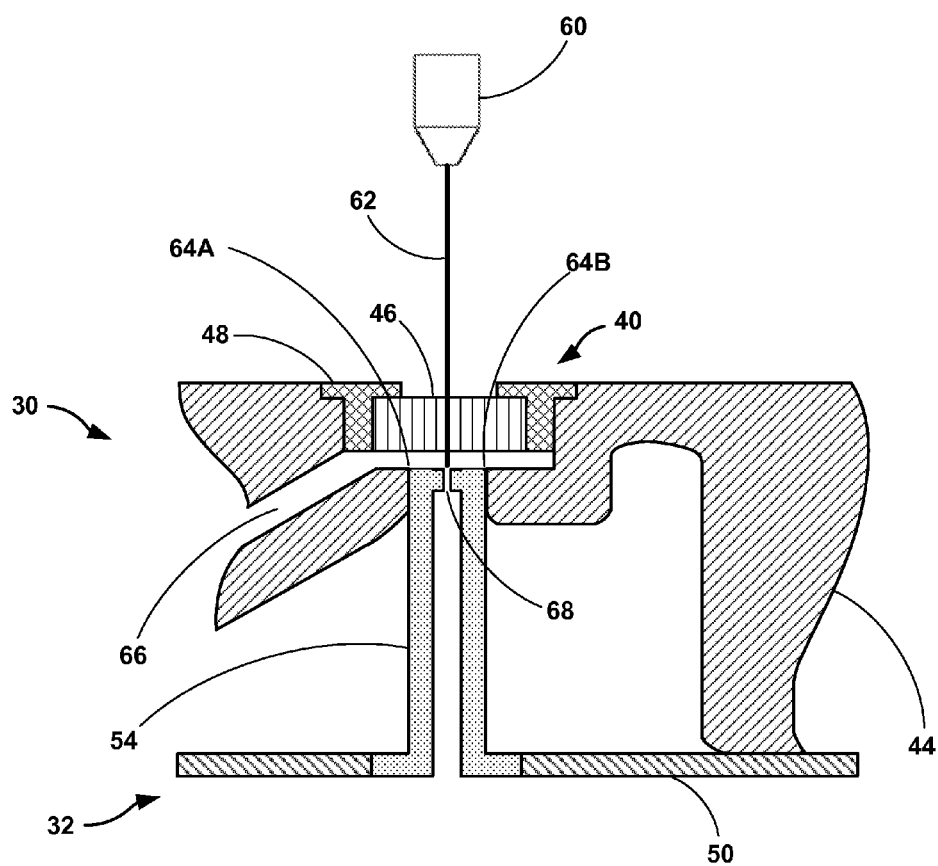
FIG. 6 is a conceptual diagram illustrating a cross-sectional view of a fluid path between two independently assembled functional modules.

FIG. 6 is a conceptual diagram illustrating a cross-sectional view of fluid path 68 between two independently assembled functional modules 30 and 32. After shell 44 of module 30 and fitting 54 of module 32 have been coupled together, radiant energy source 60 may emit beam 62 through optical feedthrough assembly 40 to puncture fitting 54. Puncturing fitting 54 may create fluid path 68 between modules 30 and 32. Fluid path 68 may provide a pathway between components enclosed in shell 44 of module 30 and components enclosed in shell 50 of module 32. In examples in which modules 30 and 32 define reservoirs that hold fluid, fluid path 68 may allow the fluid to flow between modules 30 and 32.

In some examples, pathway 66 may be hermetically-sealed prior to creating fluid path 68. For example, a cap may be welded or otherwise coupled to the opening of pathway 66 to hermetically seal pathway 66. As another example, an additional functional module, e.g., functional module 34 of IMD 6 (FIG. 1), may be coupled to pathway 66 prior to creating fluid path 68. By hermetically sealing pathway 66 prior to creating fluid path 68, fluid path 68 may create a hermetic fluid path between modules 30 and 32. For example if shells 44 and 50 provide hermetic housings for modules 30 and 32, respectively, hermetically sealing pathway 66 prior to creating fluid path 68 may allow modules 30 and 32 and fluid path 68 fluidly connecting modules 30 and 32 to be hermetically sealed.

Figure 7:
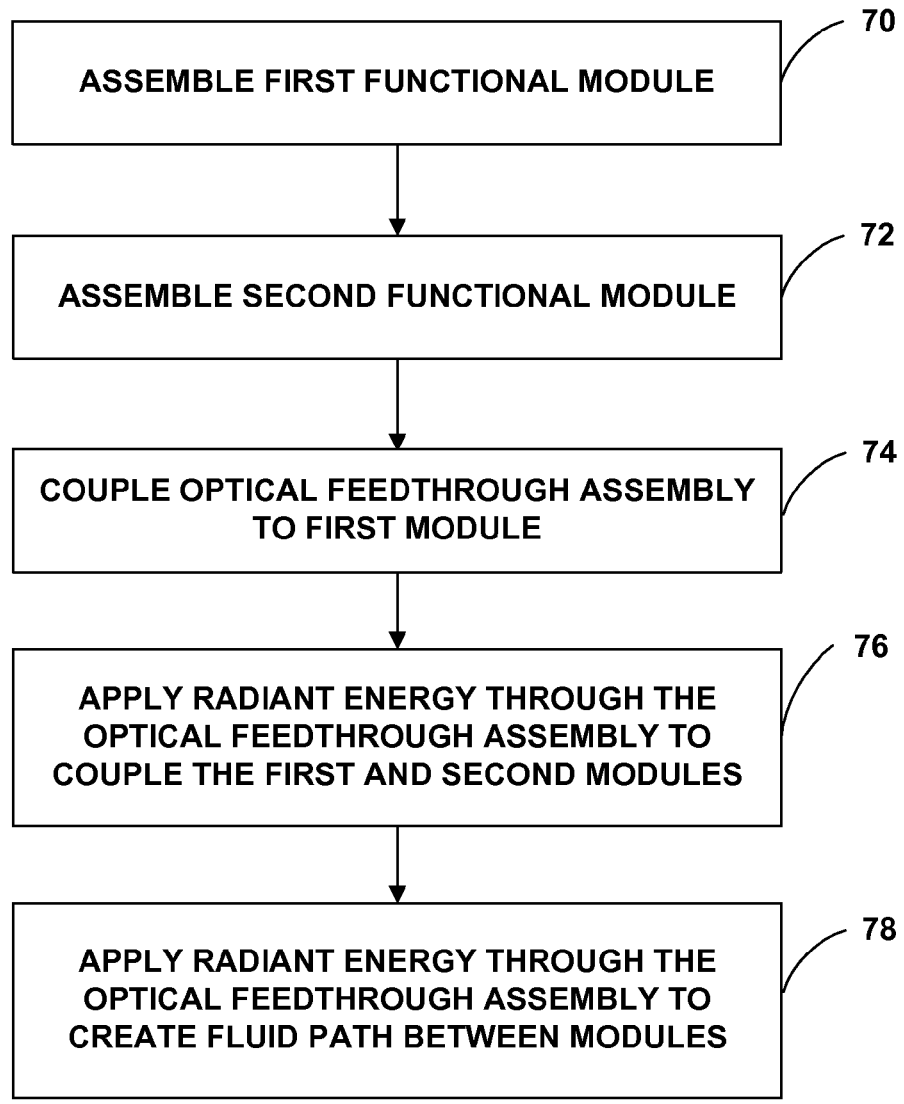
FIG. 7 is a flow diagram illustrating an example technique for coupling two independently assembled functional modules via an optical feedthrough assembly.

FIG. 7 is a flow diagram illustrating an example technique for coupling two independently assembled functional modules via an optical feedthrough assembly. Although the technique outlined in FIG. 7 is described primarily with respect to modules 30 and 32 of FIGS. 1-6, techniques for coupling two independently assembled functional modules may be applicable to any medical device partitioned into modules.

Two functional modules 30 and 32 of IMD 6 (FIG. 1) are independently assembled (70, 72). Partitioning IMD 6 into functional modules that may be independently assembled, e.g., such as modules 30 and 32, may reduce the manufacturing lead time for IMD 6. In contrast to portions of a monolithic medical device that are assembled in sequence, modules 30 and 32 may be assembled concurrently. Modules 30 and 32 may also be independently tested. Each of modules 30 and 32 may include a shell, e.g., shells 44 and 50, respectively. In some examples, shells 44 and 50 may provide hermetic housings for modules 30 and 32, respectively. In such examples, the components of modules 30 and 32 enclosed within outer housings 44 and 50, respectively, may be sterilized.

Optical feedthrough assembly 40 may be welded or otherwise coupled to shell 44 of module 30 (74). As one example, optical feedthrough assembly 40 may configured to mate with aperture 52 defined by shell 44 of module 30, and optical feedthrough assembly 40 may be welded to shell 44 around the perimeter of aperture 52. In examples in which shell 44 provides a hermetic housing for module 30, the interface between optical feedthrough assembly 40 and shell 44 may be hermetically sealed.

Modules 30 and 32 are coupled together by applying radiant energy through optical window 46 of optical feedthrough assembly 40 (76). Fitting 54 of module 32 may be configured to mate with aperture 52 defined by shell 44 of module 30. Radiant energy source 60, e.g., laser 60, may emit beam 62 through optical window 46 and into the interface between fitting 54 of module 32 and shell 44 of module 30. The interface between modules 30 and 32, and more particularly fitting 54 and shell 44, may be adjacent to optical feedthrough 40 to allow beam 62 to couple modules 30 and 32 together. As one example, beam 62 may weld fitting 54 of module 32 to shell 44 of module 30 around an outer perimeter of fitting 54. As another example, beam 62, e.g., ultraviolet beam 62, may cure an adhesive, e.g., an ultraviolet curable adhesive, on an outer perimeter of fitting 54 to couple fitting 54 of module 32 to shell 44 of module 30. In either example, the interface between modules 30 and 32 may be hermetically sealed.

Once modules 30 and 32 are coupled together, radiant energy source 60 may emit beam 62 through optical feedthrough assembly 40 to create fluid path 68 (78). For example, beam 62 may rupture fitting 54 to create fluid path 68. Fluid path 68 may provide a pathway between components enclosed in shell 44 of module 30 and components enclosed in shell 50 of module 32.

In examples in which shell 44 provides a hermetic housing for module 30, optical feedthrough assembly 40 may allow radiant energy to be transferred across hermetic boundary 44. Also, if module 30 is sterile, optical feedthrough assembly 40 may allow module 30 to be coupled to module 32 while maintaining the sterility of module 30. Additionally, if module 32 is sterile, module 32 may be coupled to module 30 using optical feedthrough assembly 40 while maintaining the sterility of module 32. As one example, optical feedthrough assembly 40 may allow two sterile modules, e.g., modules 30 and 32, to be coupled to create a combined sterile module.

Figure 8:
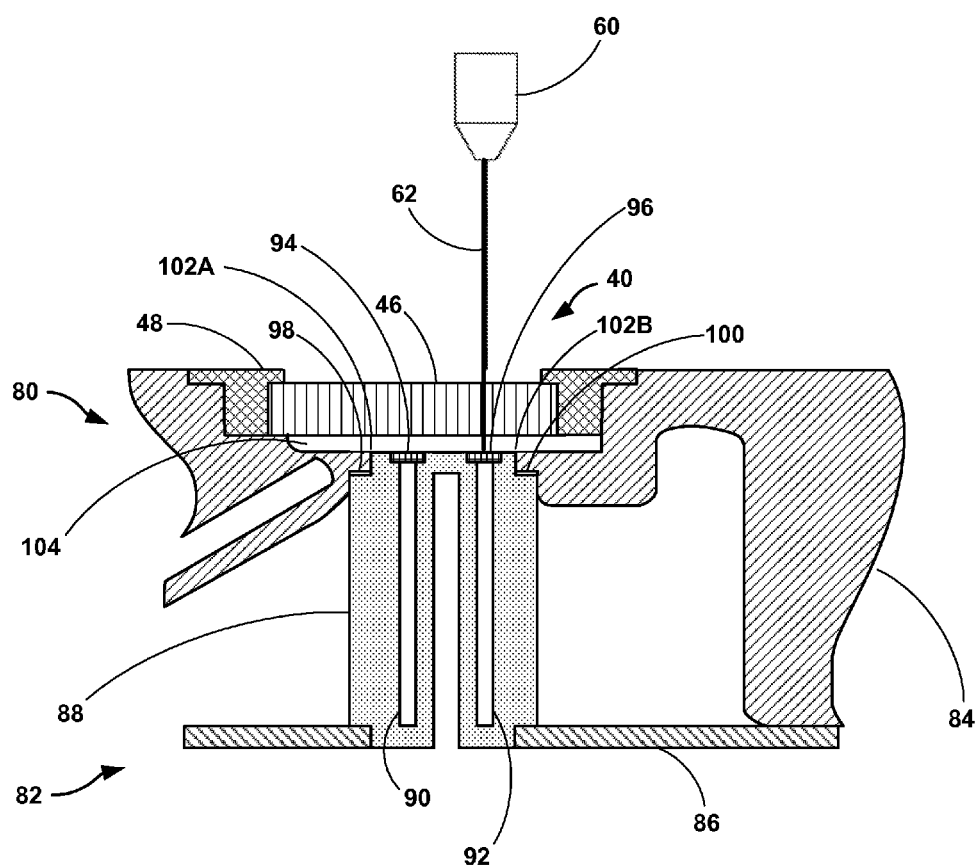
FIG. 8 is a conceptual diagram illustrating a cross-sectional view of two independently assembled functional modules coupled together.

FIG. 8 is a conceptual diagram of two independently assembled functional modules 80 and 82 coupled together. In the example illustrated in FIG. 8, module 80 is substantially similar to module 30 of FIGS. 1-6. Like module 30, module 80 includes a shell 84. In some examples, shell 84 provides a hermetic housing for module 80.

Module 82 is substantially similar to module 32 of FIGS. 1 and 3-6. In the example illustrated in FIG. 8, module 82 is drawn generically. In general, module 82 may be any independently assembled functional module of a medical device, e.g., of IMD 6 (FIG. 1). Module 82 may include a shell 86, a portion of which is illustrated in FIG. 8 for purposes of example. In some examples, shell 86 provides a hermetic housing of module 82.

In the example of FIG. 8, module 80 is coupled to an optical feedthrough assembly 40. Shell 84 of module 80 may define an aperture that facilitates the coupling of optical feedthrough assembly 40 to module 80. For example, optical feedthrough assembly 40 may mate with an aperture defined by housing 84 of module 80. The interface between optical feedthrough assembly 40 and shell 84 may be hermetically sealed.

Module 82 may include fitting 88 sized, shaped, and/or otherwise configured to couple module 82 to module 80. In the example illustrated in FIG. 8, fitting 88 defines two cavities 90 and 92. Each of cavities 90 and 92 may be filled with a respective gas, e.g., to a specified pressure, and sealed with caps 94 and 96, respectively. As one example, caps 94 and 96 may be welded to cavities 90 and 92, respectively, to seal the gases inside.

Fitting 88 may be attached to shell 84 of module 80 via seals 98 and 100. In some examples, seals 98 and 100 may be o-rings that may be compressed between modules 80 and 82. In some examples, seals 98 and 100 may create a seal between modules 80 and 82. More generally, seals 98 and 100 may attach modules 80 and 82 together. Shell 84 of module 80 may define an aperture configured to accept fitting 88 of module 82 to facilitate the attachment of modules 80 and 82.

Once modules 80 and 82 are attached via seals 98 and 100, radiant energy source 60 may emit beam 62 through optical feedthrough assembly to rupture cap 94 to release the gas, e.g., argon, from cavity 90. The gas may function as a cover gas for welding. Once the gas is released, radiant energy source 60 may emit beam 62 through optical window 44 to weld fitting 88 of module 82 to shell 84 of module 80 to couple modules 80 and 82 together, e.g., to hermetically seal modules 80 and 82 together. Welding may occur along the interface of shell 84 and fitting 88. For example, shell 84 may be welded to fitting 88 along the perimeter of fitting 88. Locations 102A and 102B represent two example positions on the perimeter of fitting 88 where welding may occur. Welding along the perimeter of fitting 88 may create a hermetically-sealed interface between modules 80 and 82.

Releasing the cover gas by rupturing cap 94 of cavity 90 via optical feedthrough assembly 40 may allow the region proximate to the weld location, e.g., below optical feedthrough assembly 40, to be pressurized with cover gas. In the example illustrated in FIG. 8, enclosure 104 may be filled with cover gas upon rupture of cap 94. Trapping the cover gas in enclosure 104 proximate to the weld location, e.g., proximate to locations 102A and 102B, may prevent the cover gas from escaping to other regions and decrease the amount of cover gas used. Reducing the amount of cover gas used may help minimize the potential environmental impact of the cover gas. In the example of FIG. 8, cavity 90 may hold a specified amount of cover gas such that, upon rupture of cap 94, enclosure 104 is filled with cover gas to a specified pressure.

The combined module 80, 82 may be exposed to a vacuum to test whether the weld between modules 80 and 82 provides a hermetic seal. More specifically, combined module 80, 82 may be placed in a vacuum chamber that is connected to a vacuum pump and a mass spectrometer. Radiant energy source 60 may emit beam 62 through optical window 46 to rupture cap 96 and release the gas, e.g., helium, from cavity 92 into enclosure 104. If the interface between modules 80 and 82 is not hermetic, the gas, e.g., helium, will leave enclosure 104 and enter the vacuum chamber. The mass spectrometer will detect to the gas, e.g., helium, and detect a leak. If the interface between modules 80 and 82 is hermetic, the gas will remain within enclosure 104, and the mass spectrometer will not detect a leak.

Figure 9:
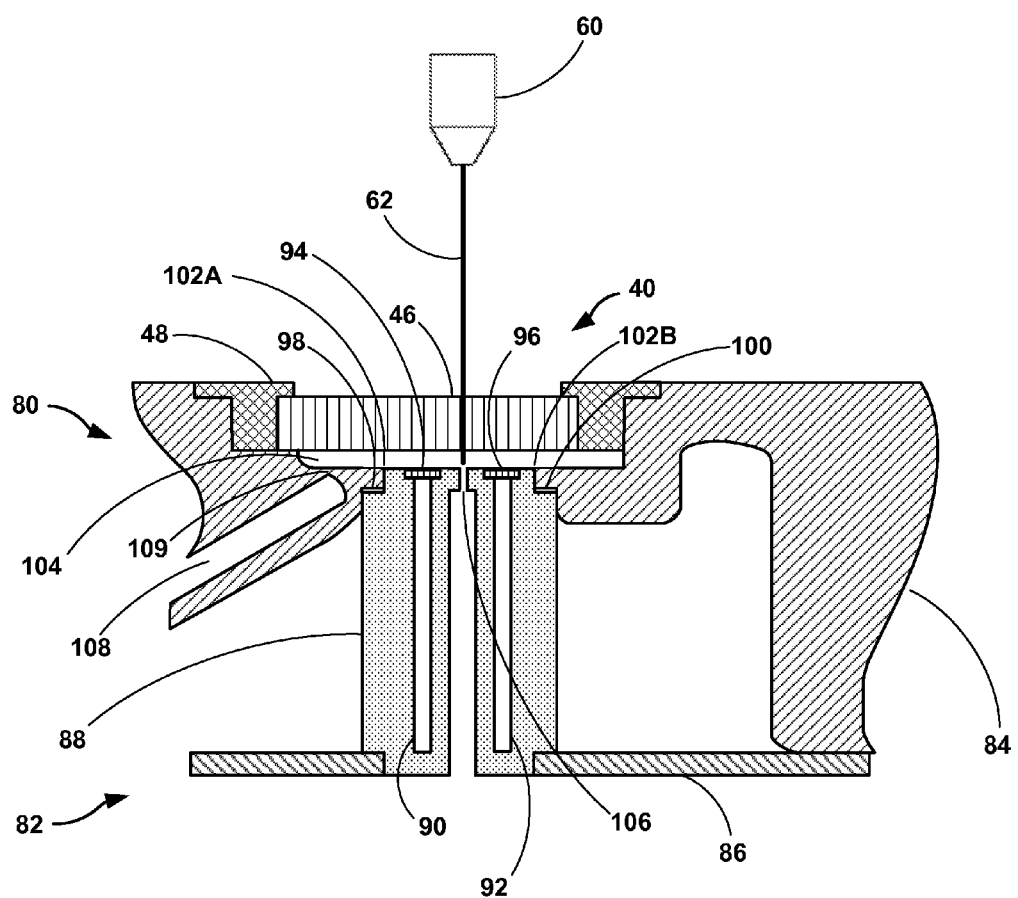
FIG. 9 is a conceptual diagram illustrating a cross-sectional view of a fluid path between two independently assembled functional modules.

As illustrated in FIG. 9, radiant energy source 60 may emit beam 62 through optical feedthrough assembly 40 to puncture fitting 88. Puncturing fitting 88 may create fluid path 106 between modules 80 and 82. Fluid path 106 may provide a pathway between components enclosed in shell 84 of module 80 and components enclosed in shell 86 of module 82. In examples in which modules 80 and 82 define reservoirs that hold fluid, fluid path 106 may allow the fluid to flow between modules 80 and 82. In examples in which the interface between modules 80 and 82 is hermetic, fluid path 106 may be a hermetic fluid path.

Shell 84 of module 80 may also define pathway 108. Pathway 108 may accept a fitting of another functional module to facilitate coupling of the combined module 80, 82 to an additional functional module of a medical device. As another example, pathway 108 may provide a fluid path to an additional functional module coupled to combined module 80, 82. Radiant energy source 60 may emit beam 62 to rupture wall 109 to create a fluid path between combined module 80, 82 and an additional functional module coupled to combined module 80, 82 via pathway 108.

Figure 10:
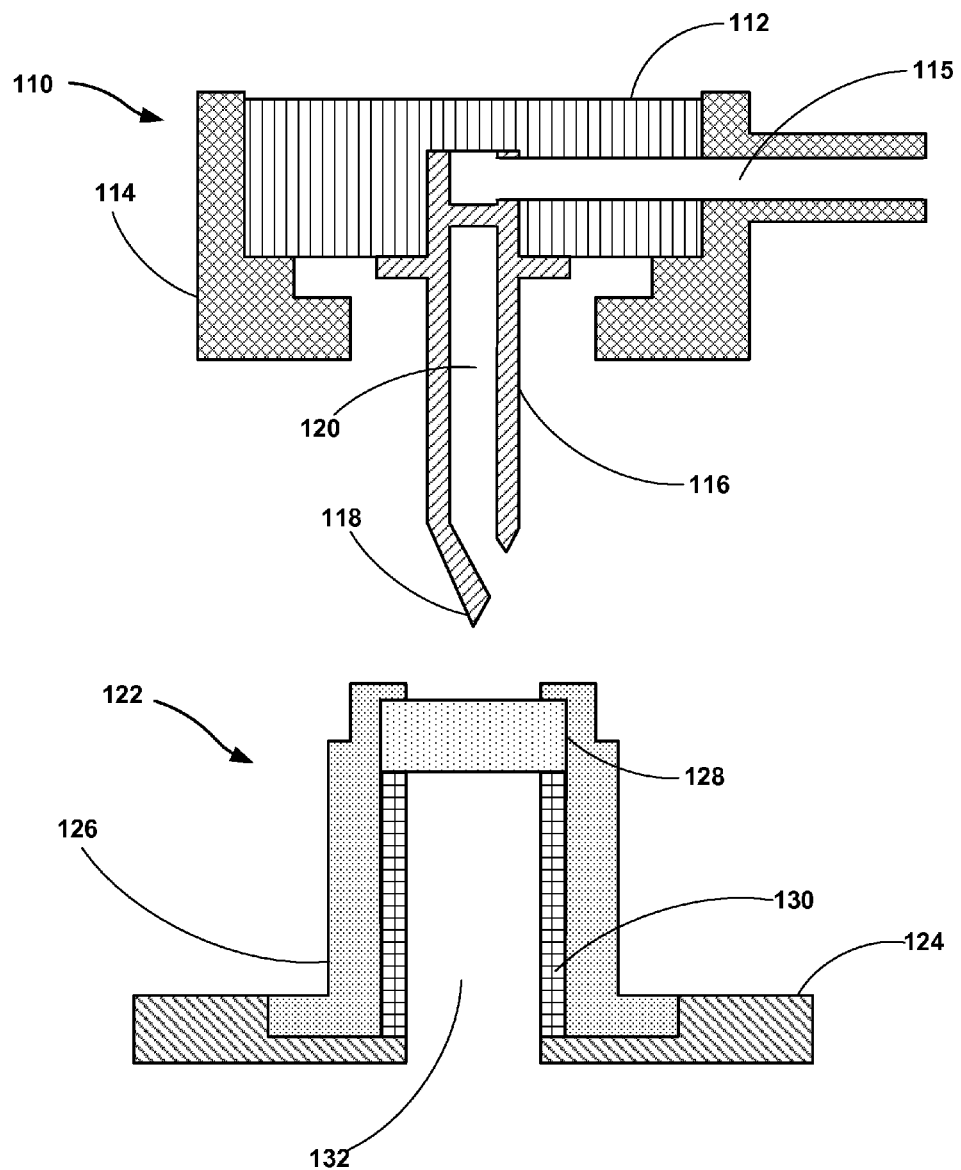
FIG. 10 is a conceptual diagram illustrating a cross-sectional view of an optical feedthrough assembly including a penetrator and a fitting assembly including a septum.

FIG. 10 is a conceptual diagram illustrating a cross-sectional view of optical feedthrough assembly 110 including penetrator 116 and fitting assembly 122 including septum 128. Optical feedthrough assembly 110 includes optical window 112, ferrule fitting 114, and penetrator 116. Optical window 112 may be configured to allow radiant energy to pass through and may be substantially similar to optical window 46 (FIG. 3). Ferrule fitting 114 may be sized, shaped, and/or otherwise configured to allow optical feedthrough assembly 110 to be coupled to a functional module (not shown) of a medical device, e.g., of IMD 6 (FIG. 1). In the example illustrated in FIG. 10, optical window 112 and ferrule fitting 114 define outlet port 115, which may provide a fluid path to a functional module of a medical device. In some examples, optical window 112 may comprise two or more window panes separated by one or more gaps that create a portion of outlet port 115. In other examples, a hollow opening in optical window 112 may create a portion of outlet port 115.

Penetrator 116 may take the form of a hypodermic needle. For example, penetrator 116 may include a sharpened tip 118 and hollow lumen 120. Penetrator 116 may be a non-coring or non-die-cutting needle such that a material is prevented from entering lumen 120 when penetrator 116 is inserted into the material. As described in further detail below, penetrator 116 may be used to create a fluid path between two functional modules.

Optical feedthrough assembly 110 may be coupled to fitting assembly 122 of a second functional module. In the example illustrated in FIG. 10, a portion of shell 124 of the second functional module is illustrated for purposes of example. In general, the second functional modules may be any functional module of a medical device, such as a pump mechanism, sensor, or reservoir. Shell 124 may provide a hermetic housing for the second functional module.

Fitting assembly 122 includes fitting 126, septum 128, and septum compression plug 130. In some examples, septum 128 may be constructed of molded silicone rubber. Septum 128 may be compressed by internal forces exerted on septum 128 by septum compression plug 130. In this manner, septum 128 may create a seal that prevents fluids from entering cavity 132 of fitting assembly 122.

Figure 11:
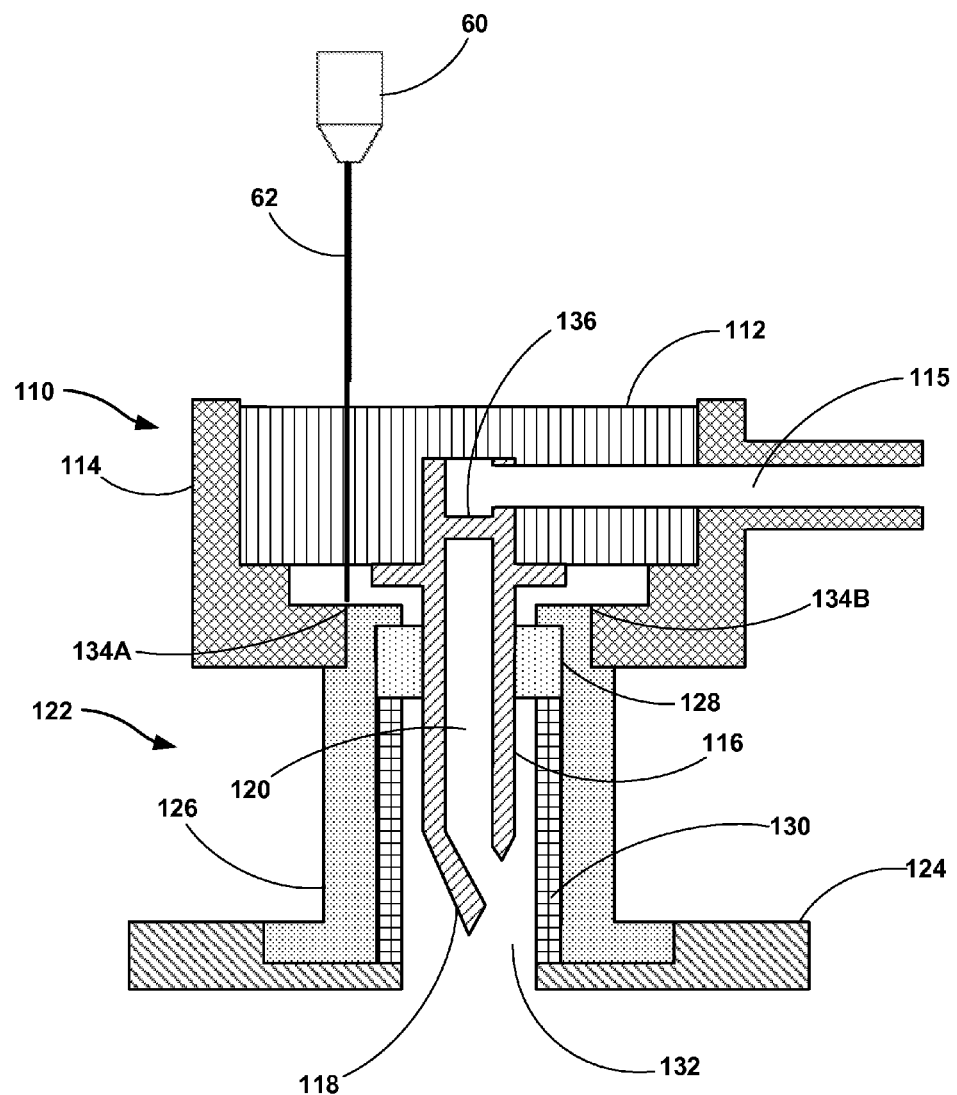
FIG. 11 is a conceptual diagram illustrating a cross-sectional view of the optical feedthrough assembly and the fitting assembly of FIG. 10 coupled together.

Penetrator 116 may pierce through septum 128 to facilitate the attachment of a first functional module coupled to optical feedthrough assembly 110 and a second functional module coupled to fitting assembly 122. As illustrated in FIG. 11, penetrator 116 may rupture septum 128 and enter cavity 132 of fitting assembly 122. The ruptured septum 128 may surround penetrator 116 such that ruptured septum 128 maintains the seal that prevents fluids from entering cavity 132 of fitting assembly 122.

Once optical feedthrough assembly 110 and fitting assembly 122 are positioned together, radiant energy source 60 may emit beam 62 through optical window 112 to couple optical feedthrough assembly 110 of the first functional module to fitting assembly 122 of the second functional module. For example, the first and second functional modules may be coupled together at the interface between ferrule fitting 114 and fitting 126. Locations 134A and 134B represent two example positions on the interface between ferrule fitting 114 and fitting 126 where beam 62 may be directed to couple ferrule fitting 114 and fitting 126. As one example, radiant energy source 60 may emit beam 62 through optical window 112 to weld fitting 126 of the second functional module to ferrule fitting 114 of the first functional module along the interface between fitting 126 and ferrule fitting 114. As another example, radiant energy source 60 may emit beam 62, e.g., an ultraviolet beam, through optical feedthrough assembly 110 to cure an adhesive, e.g., an ultraviolet curable adhesive, on the interface between ferrule fitting 114 and fitting 126 to couple ferrule fitting 114 of the first functional module to fitting 126 of the second functional module. In either example, the interface between ferrule fitting 114 and fitting 126 may be hermetically sealed.

Figure 12:
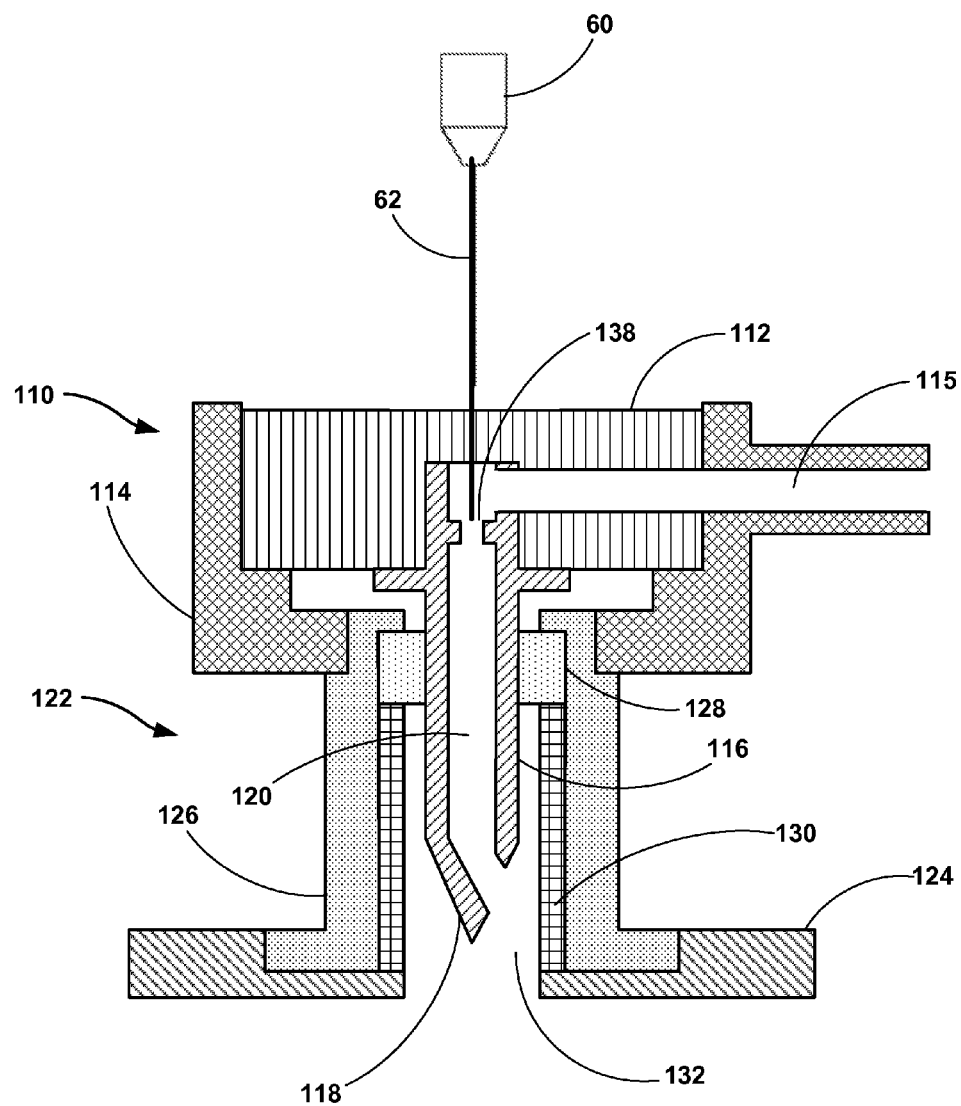
FIG. 12 is a conceptual diagram illustrating a cross-sectional view of a fluid path between the optical feedthrough assembly and fitting assembly of FIG. 11.

Radiant energy source 60 may also emit beam 62 through optical window 112 to rupture wall 136 within lumen 120 of penetrator 116 to create fluid path 138, as illustrated in FIG. 12. Fluid path 138 may provide a pathway between components enclosed in a first functional module coupled to optical feedthrough assembly 110 and components enclosed in a second functional module coupled to fitting assembly 122. In some examples, fluid path 138 may provide a hermetic fluid path between the two functional modules. In other examples, wall 136 may be omitted such that lumen 120 of penetrator 116 is open throughout the coupling process.

Figure 13:
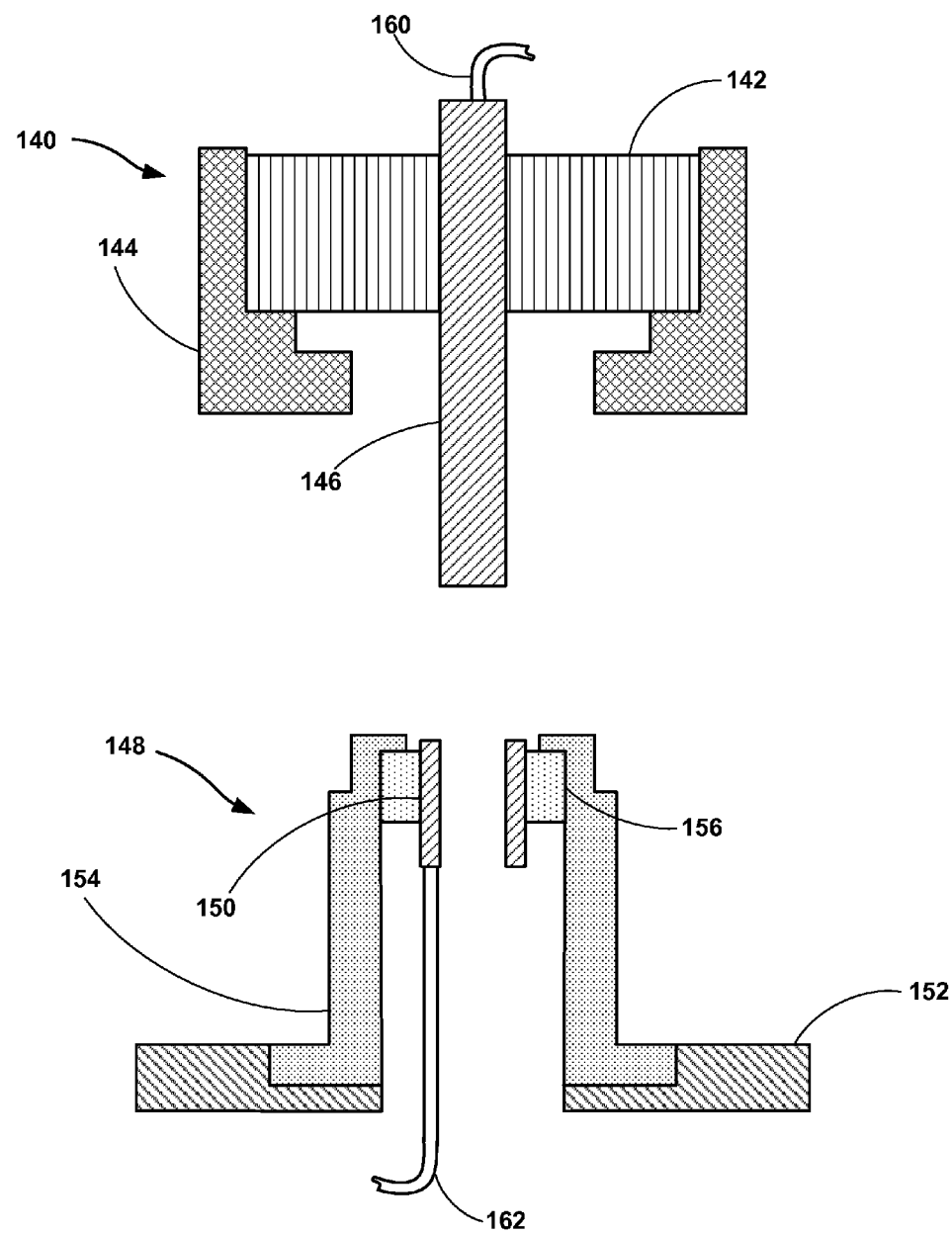
FIG. 13 is a conceptual diagram illustrating a cross-sectional view of an open electrical path between two independently assembled functional modules, of which one module contains an optical feedthrough assembly with an electrode, and the second module contains a mating electrode for connection to electrode in the optical feedthrough assembly.

FIG. 13 is a conceptual diagram illustrating a cross-sectional view of optical feedthrough assembly 140 including electrode 146 and fitting assembly 148 including electrode 150. Optical feedthrough assembly 140 includes optical window 142, ferrule fitting 144, and electrode 146. Optical window 142 may be configured to allow radiant energy to pass through and may be substantially similar to optical window 46 (FIG. 3). Ferrule fitting 144 may be sized, shaped, and/or otherwise configured to allow optical feedthrough assembly 140 to be coupled to a functional module (not shown) of a medical device, e.g., of IMD 6 (FIG. 1). As described in further detail below, electrode 146 may be used to create an electrical connection between two functional modules, which may be particularly useful when assembling a medical device, e.g., IMD 6 (FIG. 1).

Optical feedthrough assembly 140 may be coupled to fitting assembly 148 of a second functional module. In the example illustrated in FIG. 13, a portion of shell 152 of the second functional module is illustrated for purposes of example. In general, the second functional modules may be any functional module of a medical device, such as a pump mechanism, sensor, or reservoir. Shell 152 may provide a hermetic housing for the second functional module.

Figure 14:
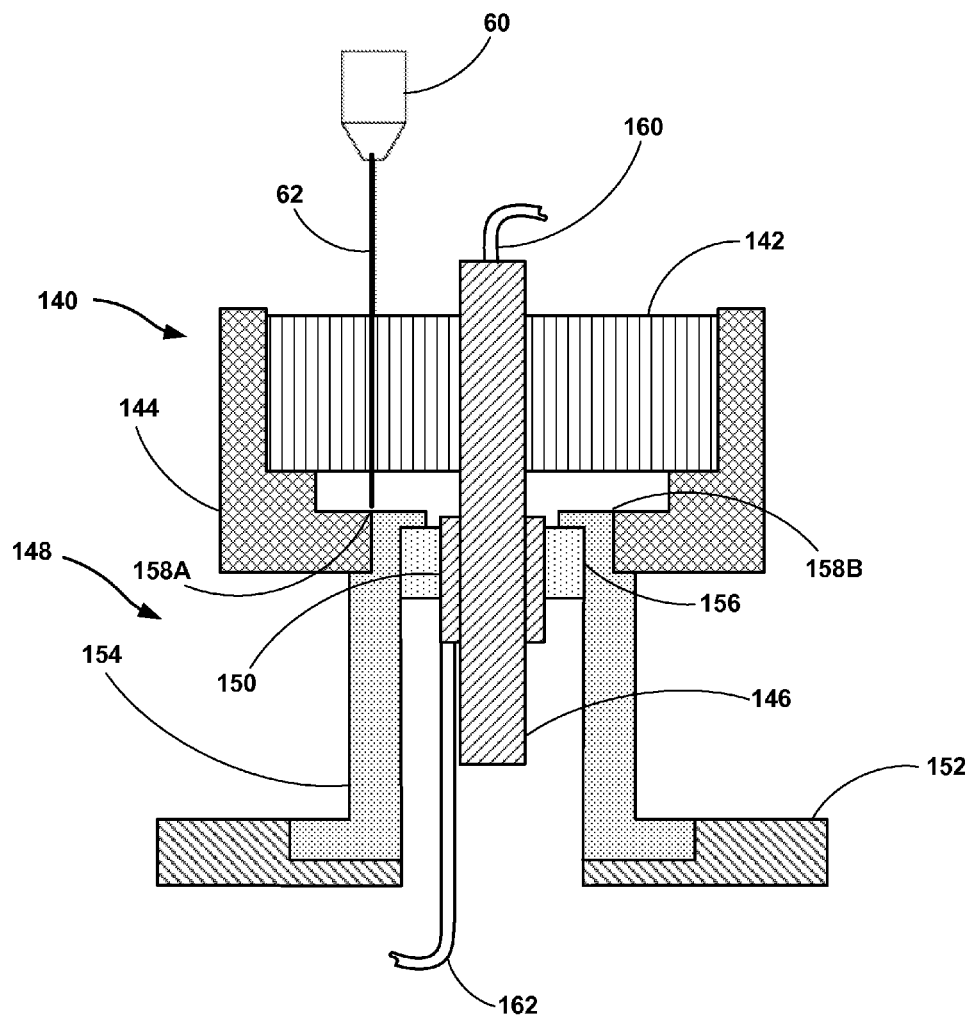
FIG. 14 is a conceptual diagram illustrating a cross-sectional view of the closed electrical path that is created by connecting the mating electrodes of two independently assembled functional modules, and shows one option for the location of a weld seam, which upon completion of the weld by using radiant energy directed through the optical feedthrough assembly, may hermetically isolate the electrical connection from the outside environment.

Fitting assembly 148 includes fitting 154, electrode 150, and insulator 156. Electrode 146 may be configured to fit adjacent to electrode 150 to facilitate the attachment of a first functional module coupled to optical feedthrough assembly 140 and a second functional module coupled to fitting assembly 148 and the electrical connection between electrodes 146 and 150. As illustrated in FIG. 14, electrode 146 may contact electrode 150 of fitting assembly 148 to create an electrical connection between electrodes 146 and 150. Insulator 156 may surround electrode 150 such that electrode 150 is electrically isolated from other components of fitting assembly 148, such as fitting 154. Electrode 146 may be coupled to wire 160, which may in turn be coupled to electrical components (not shown) within the first functional module. Likewise, electrode 150 may be coupled to wire 162, which may in turn be coupled to electrical components (not shown) within the second functional module. In this manner, the electrical connection between electrodes 146 and 150 may create an electrical interconnect between electrical components within the first and second functional modules.

Once optical feedthrough assembly 140 and fitting assembly 148 are positioned together, radiant energy source 60 may emit beam 62 through optical window 142 to couple optical feedthrough assembly 140 of the first functional module to fitting assembly 148 of the second functional module. For example, the first and second functional modules may be coupled together at the interface between ferrule fitting 144 and fitting 154. Locations 158A and 158B represent two example positions on the interface between ferrule fitting 144 and fitting 154 where beam 62 may be directed to couple ferrule fitting 144 and fitting 154. As one example, radiant energy source 60 may emit beam 62 through optical window 142 to weld fitting 154 of the second functional module to ferrule fitting 144 of the first functional module along the interface between fitting 154 and ferrule fitting 144. As another example, radiant energy source 60 may emit beam 62, e.g., an ultraviolet beam, through optical feedthrough assembly 140 to cure an adhesive, e.g., an ultraviolet curable adhesive, on the interface between ferrule fitting 144 and fitting 154 to couple ferrule fitting 144 of the first functional module to fitting 154 of the second functional module. In either example, the interface between ferrule fitting 144 and fitting 154 may be hermetically sealed.

Additional modules of an IMD, e.g., IMD 6 (FIG. 1), may be assembled and coupled to the combination of the first and second functional modules via one or more optical feedthrough assemblies. In general, a module may include any number of optical feedthrough assemblies and/or fittings to facilitate coupling to any number of other modules. As one example, a first functional module may include a fitting to facilitate coupling to a second functional module and an optical feedthrough assembly to facilitate coupling to third functional module.

Although FIGS. 3-14 and their associated description generally refers to coupling functional modules of an IMD together, optical feedthrough assemblies may also permit separation of various modules, e.g., modules 30, 32, and 34 (FIG. 1) of IMD 6. For example, radiant energy source 60 may emit beam 62 through an optical window to decouple modules 30 and 32, e.g., by cutting along the interface between modules 30 and 32.

Various embodiments of the invention have been described. These and other embodiments are within the scope of the following claims.

The invention claimed is:

1. A system comprising:
   a first functional module of a medical device;
   a second functional module of the medical device;
   an optical feedthrough assembly different than the first functional module and coupled to the first functional module; and
   a radiant energy source that emits a beam through the optical feedthrough assembly to perform a manufacturing process on the first functional module and the second functional module.

2. The system of claim 1, wherein the first functional module comprises a shell that encloses components within the first functional module, wherein the optical feedthrough assembly is coupled to the shell of the first functional module.

3. The system of claim 1, wherein the second functional module comprises a fitting that mates with an aperture defined by the first functional module.

4. The system of claim 1, wherein the second functional module comprises a shell that encloses components within the second functional module.

5. The system of claim 1, wherein the medical device comprises an implantable medical device.

6. The system of claim 1, wherein the medical device comprises a therapeutic agent delivery device.

7. The system of claim 1, wherein the optical feedthrough assembly comprises an optical window that allows the beam through the optical feedthrough assembly, wherein the optical window is at least one of transparent or translucent to light of the beam.

8. The system of claim 1, wherein the manufacturing process comprises at least one of coupling the first functional module and the second functional module, detaching the first functional module and the second function module, and creating a fluid path between the first functional module and the second functional module.

9. The system of claim 2, wherein an interface between the shell and the optical feedthrough assembly is hermetically sealed.

10. The system of claim 2, wherein the shell provides a hermetic housing for the first functional module.

11. The system of claim 2, wherein the components enclosed in the shell are sterile.

12. The system of claim 4, wherein the shell provides a hermetic housing for the second functional module.

13. The system of claim 4, wherein the components enclosed in the shell are sterile.

14. The system of claim 6, wherein the first functional module comprises a catheter access port.

15. The system of claim 7, wherein the optical window comprises at least one of glass, sapphire, polymer, or a crystalline material.

16. The system of claim 8, wherein the first functional module, second functional module, and optical feedthrough assembly are all configured to allow the radiant energy source to emit the beam through the optical feedthrough assembly to couple the first functional module and the second functional module and create a fluid path between the first functional module and the second functional module.

17. A method comprising:
assembling a first functional module of a medical device;
assembling a second functional module of the medical device;
coupling an optical feedthrough assembly to the first functional module, wherein the optical feedthrough assembly is different than the first functional module; and
applying radiant energy through the optical feedthrough assembly to perform a manufacturing process on the first functional module and the second functional module.

18. The method of claim 17, wherein coupling the optical feedthrough assembly to the first functional module comprises welding the optical feedthrough assembly to the first functional module.

19. The method of claim 17, wherein applying radiant energy through the optical feedthrough assembly to perform a manufacturing process on the first functional module and the second functional module comprises coupling the first functional module and the second functional module by welding the first functional module to the second functional module.

20. The method of claim 17, wherein the second functional module comprises a shell that encloses components within the second functional module, further comprising sterilizing the components enclosed in the shell.

21. The method of claim 17, further comprising hermetically sealing the second functional module.

22. The method of claim 17, wherein the performing the manufacturing process comprises at least one of coupling the first functional module and the second functional module, detaching the first functional module and the second function module, and creating a fluid path between the first functional module and the second functional module.

23. The method of claim 18, wherein coupling the optical feedthrough assembly to the first functional module comprises coupling the optical feedthrough assembly to a shell of the first functional module that encloses components within the first functional module.

24. The method of claim 23, wherein coupling the optical feedthrough assembly to the shell of the first functional module comprises hermetically sealing an interface between the shell and the optical feedthrough assembly.

25. The method of claim 23, further comprising sterilizing the components enclosed in the shell.

26. The method of claim 19, further comprising applying radiant energy through the optical feedthrough assembly to create a fluid path between the first functional module and the second functional module.

27. A system comprising:
a first functional module of a medical device;
a second functional module of the medical device;
means for optically transmitting radiant energy to at least one of the first functional module and the second functional module, wherein the means for optically transmitting radiant energy is different than the first functional module; and
means for applying radiant energy through the means for optically transmitting radiant energy to perform a manufacturing process on the first functional module and the second functional module.

28. The system of claim 8, wherein the manufacturing process comprises at least one of coupling the first functional module and the second functional module, detaching the first functional module and the second function module, and creating a fluid path between the first functional module and the second functional module.

* * * * *

UNITED STATES PATENT AND TRADEMARK OFFICE
CERTIFICATE OF CORRECTION

PATENT NO. : 9,724,784 B2  
APPLICATION NO. : 12/401239  
DATED : August 8, 2017  
INVENTOR(S) : Robinson et al.

Page 1 of 1

It is certified that error appears in the above-identified patent and that said Letters Patent is hereby corrected as shown below:

Column 14, Line 30: "The system of claim 8" should read --The system of claim 27--

Signed and Sealed this  
Ninth Day of January, 2018

Joseph Matal  
*Performing the Functions and Duties of the*  
*Under Secretary of Commerce for Intellectual Property and*  
*Director of the United States Patent and Trademark Office*